US009073538B2

(12) United States Patent
Mack et al.

(10) Patent No.: US 9,073,538 B2
(45) Date of Patent: Jul. 7, 2015

(54) TWO-SPEED ELECTRIC DRIVE MODULE FOR ELECTRIC AND HYBRID VEHICLES

(71) Applicants: Noel R. Mack, Rochester, MI (US); John R. Forsyth, Romeo, MI (US); David W. Wenthen, Rochester Hills, MI (US); Mario Charles DeSantis, Camillus, NY (US); Kelly Rathnaw, St. Clair Shores, MI (US)

(72) Inventors: Noel R. Mack, Rochester, MI (US); John R. Forsyth, Romeo, MI (US); David W. Wenthen, Rochester Hills, MI (US); Richard A. Bakowski, Warners, NY (US); Mario Charles DeSantis, Camillus, NY (US); Kelly Rathnaw, St. Clair Shores, MI (US)

(*) Notice: Subject to any disclaimer, the term of this patent is extended or adjusted under 35 U.S.C. 154(b) by 28 days.

(21) Appl. No.: 14/043,901

(22) Filed: Oct. 2, 2013

(65) Prior Publication Data
US 2014/0106921 A1 Apr. 17, 2014

Related U.S. Application Data

(63) Continuation of application No. 13/128,008, filed as application No. PCT/US2009/062142 on Oct. 27, 2009, now Pat. No. 8,556,760.

(60) Provisional application No. 61/112,339, filed on Nov. 7, 2008.

(51) Int. Cl.
*F16H 37/06* (2006.01)
*B60K 6/547* (2007.10)
(Continued)

(52) U.S. Cl.
CPC .............. *B60W 10/115* (2013.01); *B60K 6/547* (2013.01); *B60K 2001/001* (2013.01); *Y02T 10/6265* (2013.01); *Y10S 903/915* (2013.01); *B60K 6/52* (2013.01); *Y02T 10/6221* (2013.01); *B60W 10/08* (2013.01); *B60K 6/48* (2013.01); *B60K 1/00* (2013.01)

(58) Field of Classification Search
USPC ......... 475/114, 149–152, 198, 221, 230, 295, 475/296, 302, 311, 343
See application file for complete search history.

(56) References Cited

U.S. PATENT DOCUMENTS 4,418,777 A * 12/1983 Stockton ..................... 180/65.6
5,554,080 A * 9/1996 Dangel ......................... 475/204
(Continued)

FOREIGN PATENT DOCUMENTS

WO    WO 2008034520 A1 * 3/2008 ............... B60K 1/00

*Primary Examiner* — Justin Holmes
(74) *Attorney, Agent, or Firm* — Dickinson Wright, PLLC

(57) ABSTRACT

An electric drive module for a motor vehicle includes an electric motor, a first input member, a first output member and a two-speed module selectively drivingly interconnecting the first input member and the first output member at one of two different drive ratios. A reduction unit includes a second input member being driven by the first output member and has a second output member being driven at a reduced speed relative to the second input member. A differential assembly has an input driven by said second output member. A first differential output drives a first output shaft, and a second differential output drives a second output shaft.

26 Claims, 12 Drawing Sheets

(51) Int. Cl.
- *B60K 6/52* (2007.10)
- *B60W 10/08* (2006.01)
- *B60K 6/48* (2007.10)
- *B60W 10/115* (2012.01)
- *B60K 1/00* (2006.01)

(56) References Cited

U.S. PATENT DOCUMENTS 5,735,767 A * 4/1998 Forsyth .................. 475/269
7,247,117 B2 * 7/2007 Forster .................. 475/221

* cited by examiner

TWO-SPEED ELECTRIC DRIVE MODULE FOR ELECTRIC AND HYBRID VEHICLES

CROSS-REFERENCE TO RELATED APPLICATIONS

This application is a continuation of U.S. Ser. No. 13/128,008 filed May 6, 2011 which is a U.S. National Phase of PCT/US2009/062142 filed on Oct. 27, 2009 which claims the benefit of U.S. Provisional Application No. 61/112,339, filed on Nov. 7, 2008. The entire disclosure of the above application is incorporated herein by reference.

FIELD

The present disclosure relates to electric drive systems for motor vehicles. More specifically, the present disclosure relates to a two-speed electric drive module for electric and hybrid vehicles.

BACKGROUND

Automobile manufacturers are actively working to develop alternative powertrain systems in an effort to reduce the level of pollutants exhausted into the air by conventional vehicles equipped with internal combustion engines. Significant development has been directed to electric vehicles and fuel cell vehicles. These alternative powertrain systems are still under development. In addition, several different hybrid electric vehicles have recently been offered for sale. These hybrid vehicles are equipped with an internal combustion engine and an electric motor that can be operated independently or in combination to drive the vehicle.

There are two typical types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid powertrains have also been adapted for use in four-wheel drive vehicles and typically utilize the above-noted parallel hybrid powertrain to drive the primary wheels and a second electric motor to drive the secondary wheels. Obviously, such a four-wheel drive system is extremely expensive and difficult to package. Thus, a need exists to develop solely electrically powered or hybrid powertrains for use in four-wheel drive vehicles that utilize many conventional powertrain components so as to minimize specialized packaging and reduce cost.

SUMMARY

An electric drive module for a motor vehicle includes an electric motor, a first input member, a first output member and a two-speed module selectively drivingly interconnecting the first input member and the first output member at one of two different drive ratios. A reduction unit includes a second input member being driven by the first output member and has a second output member being driven at a reduced speed relative to the second input member. A differential assembly has an input driven by said second output member. A first differential output drives a first output shaft, and a second differential output drives a second output shaft.

Further areas of applicability of the present disclosure will become apparent from the detailed description provided hereinafter. However, it should be understood that the detailed description and specific examples, while indicating preferred embodiments of the present disclosure, are intended for purposes of illustration only since various changes and modifications within the fair scope of this particular disclosure will become apparent to those skilled in the art.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is related to an electric drive module assembly including an electric motor. The electric drive module is electrically-controlled for delivering motive power (i.e., drive torque) to a pair of ground-engaging wheels. The compact arrangement of the electric motor, a single speed gearbox and an optional two-speed module permits the use of the electric drive module in substitution for a conventional axle assembly. As such, conventional rear-wheel drive and front-wheel drive powertrains can be used in combination with the electric drive module so as to establish a hybrid drive system for a four-wheel drive vehicle. Alternatively, the electric drive module may be used in vehicles powered solely by batteries as well. Accordingly, various features and functional characteristics of the electric drive module will be set forth below in a manner permitting those skilled in relevant arts to fully comprehend and appreciate the significant advantages the present disclosure provides.

Figure 1:
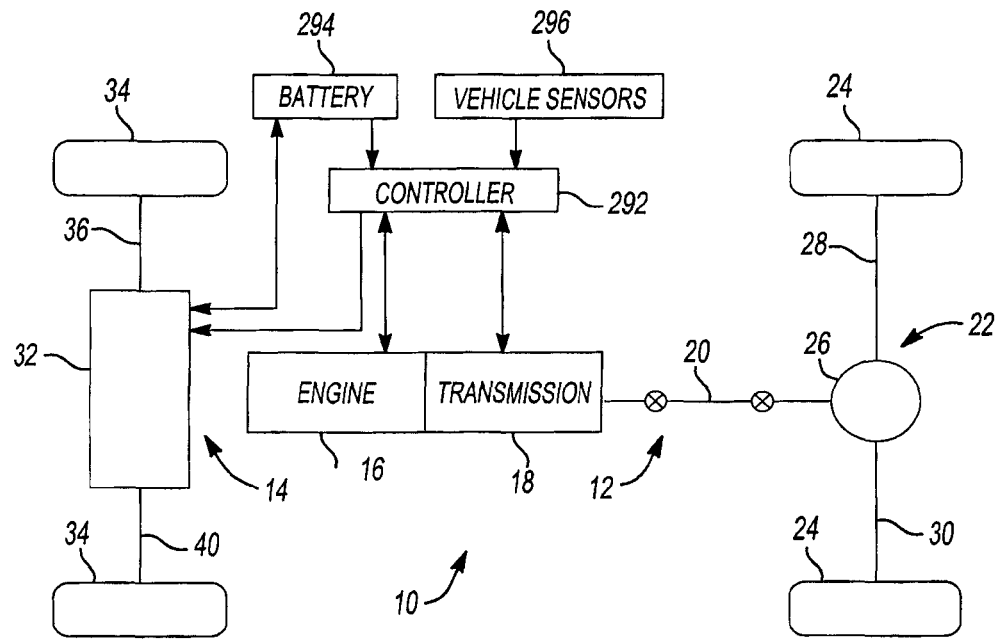
FIG. 1 is a schematic view showing a hybrid powertrain for a four-wheel drive vehicle in accordance with the present disclosure.

Referring to FIG. 1, a four-wheel drive powertrain for a hybrid electric vehicle 10 is shown to include a first powered driveline 12 and a second powered driveline 14. First powered driveline 12 includes an internal combustion engine 16, a transmission 18, a drive shaft 20, and an axle assembly 22 connecting a pair of wheels 24. Engine power is delivered to a differential unit 26 associated with axle assembly 22 through transmission 18 and drive shaft 20. The drive torque delivered to differential unit 26 is transferred through axle-shafts 28 and 30 to wheels 24. Second powered driveline 14 includes an electric drive module 32 which drives a second pair of wheels 34 through axleshafts 36 and 40.

Figure 2:
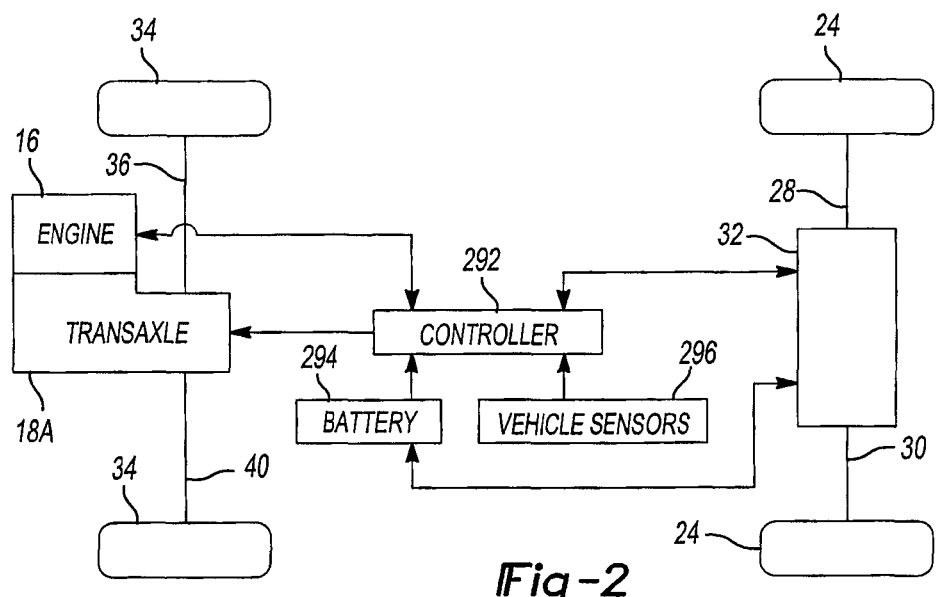
FIG. 2 is a schematic view of an alternative arrangement for the hybrid powertrain of the present disclosure.

In the particular layout shown in FIG. 1, first powered driveline 12 delivers power to rear wheels 24 while second powered driveline 14 delivers power to front wheels 34. Obviously, those skilled in the art would understand that the opposite powertrain arrangement can be utilized such that electric drive module 32 supplies power to the rear wheels. To better illustrate this arrangement, FIG. 2 shows module 32 supplying power to rear wheels 24 through axleshafts 28 and 30 while engine power is supplied to front wheels 34 through a transaxle 18A and axleshafts 36 and 40. Regardless of the particular arrangement, hybrid vehicle 10 includes two distinct powered drivelines capable of both independent and combined operation to drive the vehicle.

Figure 3:
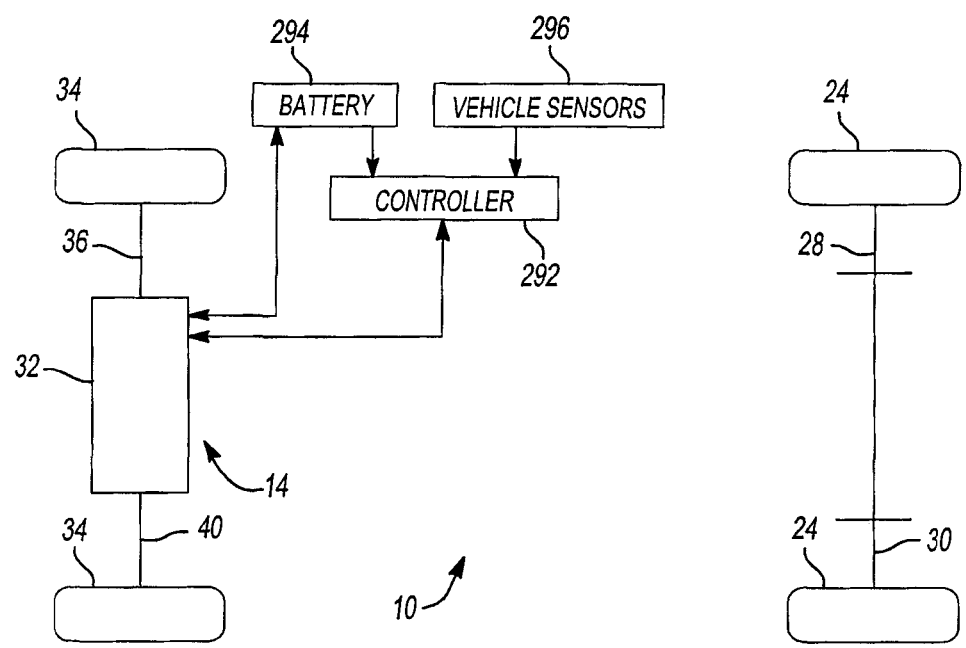
FIG. 3 is a schematic view of an alternative arrangement electric powertrain of the present disclosure.

As shown in FIG. 3, it is also contemplated that electric drive module 32 may be the sole source of motive power for vehicle 10. An internal combustion engine would not be present. Accordingly, front wheels 34 receive torque through axleshafts 36 and 40 provided by electric drive module 32.

Figure 4:
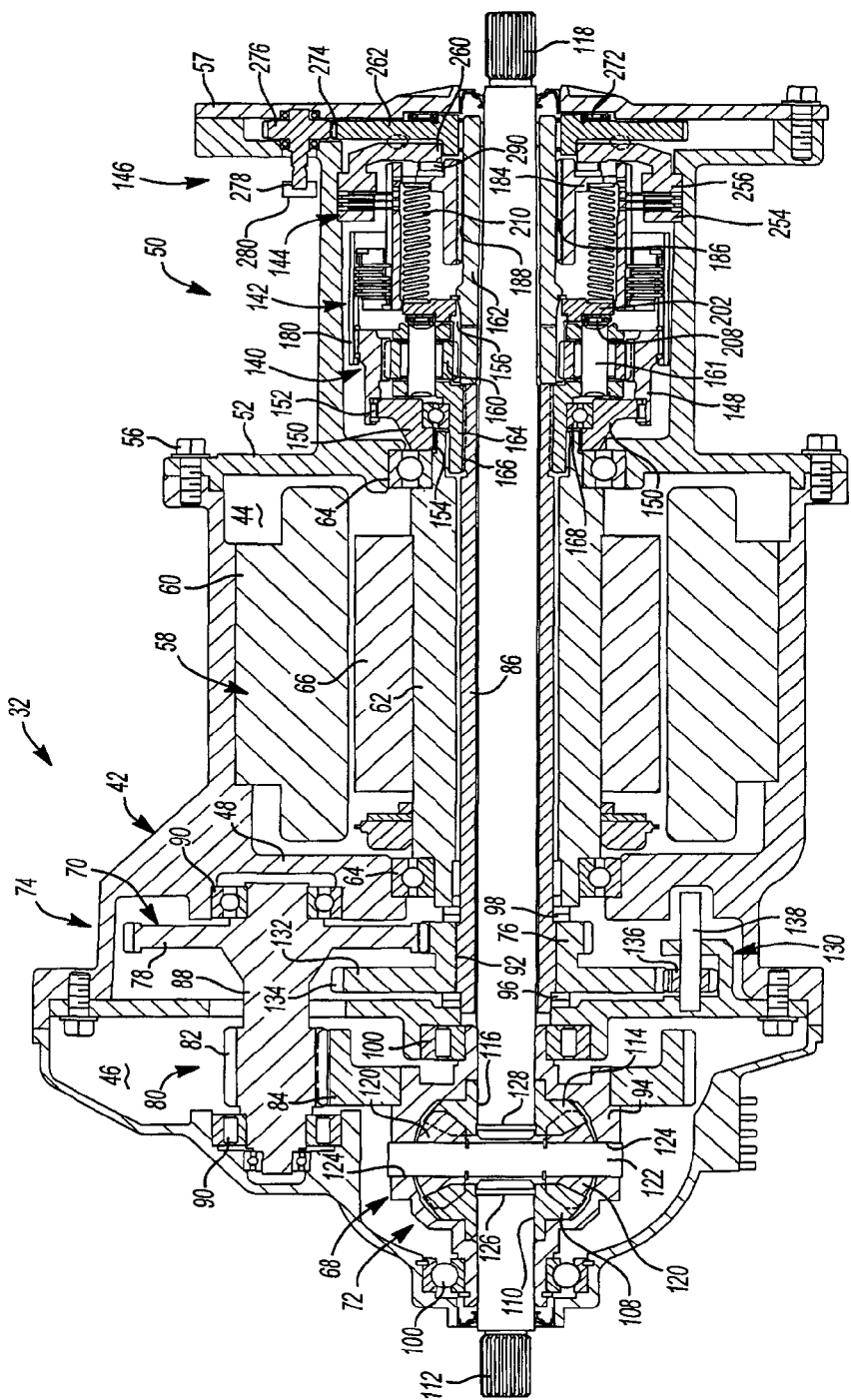
FIG. 4 is a sectional view of an electric drive module associated with the powertrains of FIGS. 1-3.
Figure 5:
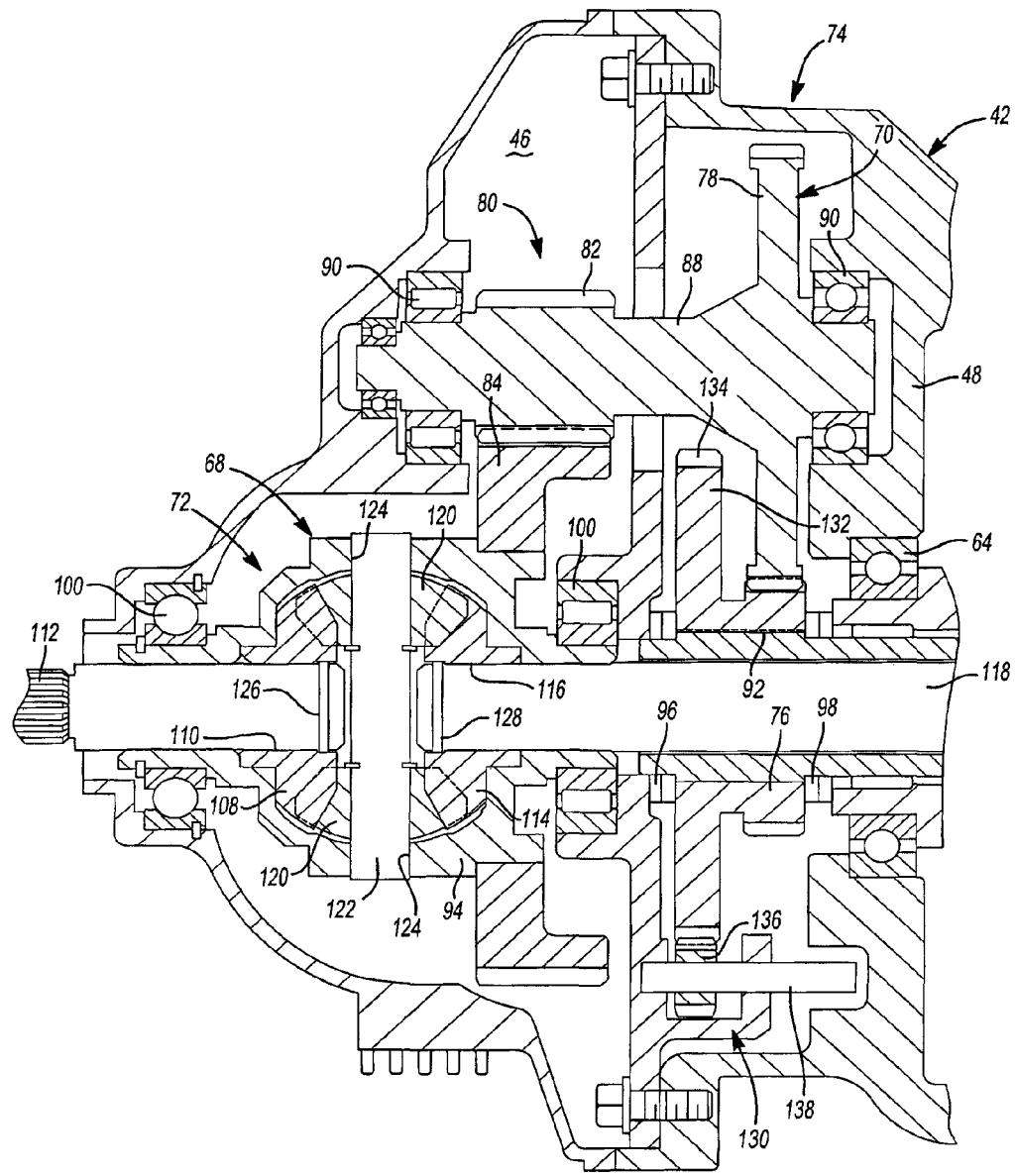
FIG. 5 is a sectional view of an enlarged portion of FIG. 4 showing the components associated with the gearbox of the electric drive module in greater detail.
Figure 6:
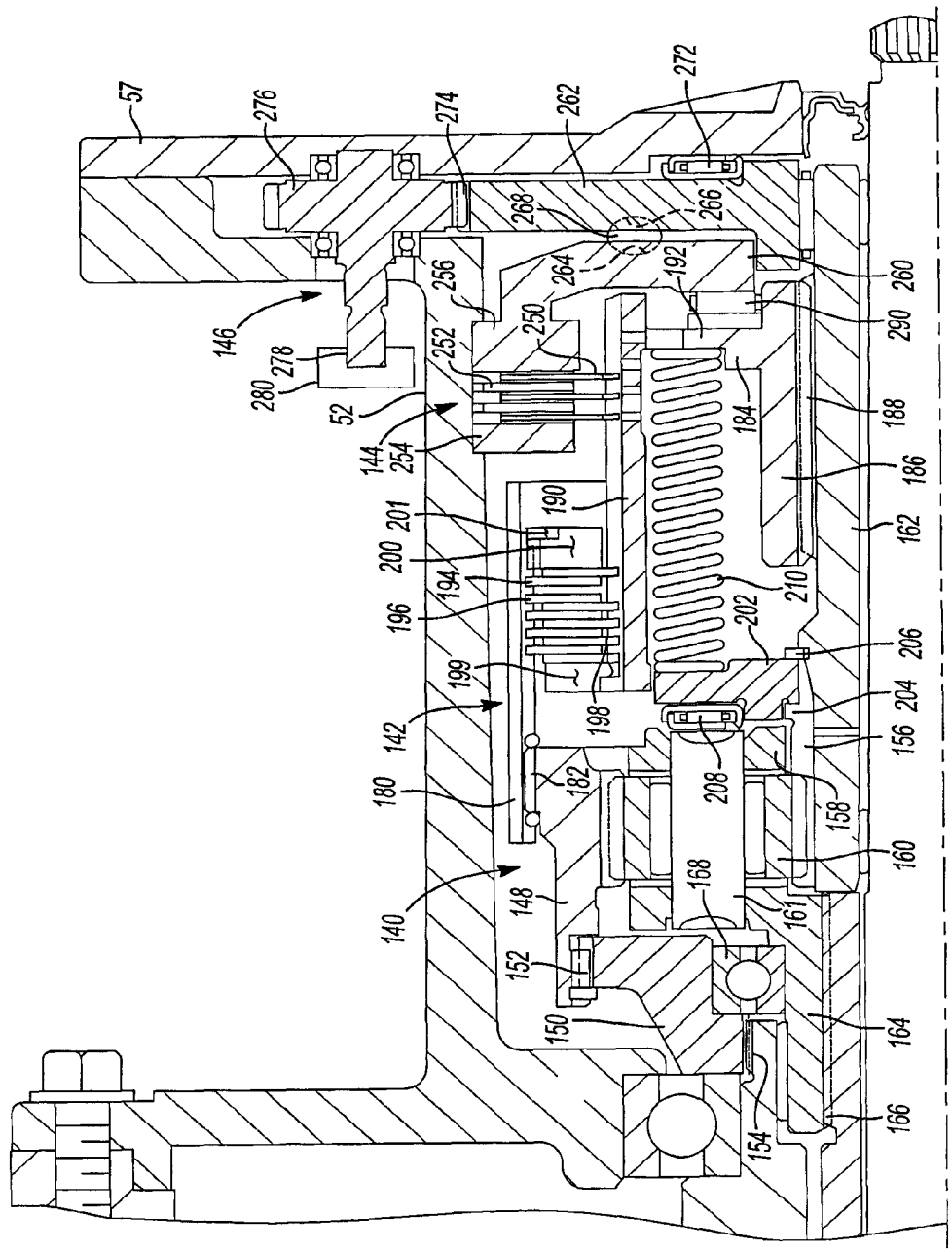
FIG. 6 is sectional view of another enlarged portion of FIG. 4 showing the components associated with the two-speed module.

Referring now to FIGS. 4-6, electric drive module 32 will be described in detail. Electric drive module 32 includes a multi-section housing assembly 42 defining a motor chamber 44 and a gearbox chamber 46 separated by a radial support wall 48. Electric drive module 32 may be configured as a single speed or a two-speed power transmission device. A two-speed drive module 50 may be coupled to housing assembly 42 as a bolt-on modification to provide the two-speed function. Two-speed drive module 50 includes a case 52 having a first end fixed to housing assembly 42 via fasteners 56. A second end of case 52 is sealed by a cap 57. An electric variable speed motor assembly 58 is located within motor chamber 44 and includes a wound stator 60 secured to housing assembly 42 and an elongated tubular rotor shaft 62. Rotor shaft 62 is supported at its opposite ends by bearing assemblies 64 for rotation relative to housing assembly 42. Motor assembly 58 also includes a rotor assembly 66 fixed for rotation with rotor shaft 62.

Electric drive module 32 further includes a gearbox 68 located within gearbox chamber 46 and which is comprised of a reduction unit 70 and a bevel differential 72. Reduction unit 70 includes a first reduction gearset 74 having a first drive gear 76 in constant meshed engagement with a first driven gear 78 as well as a second reduction gearset 80 having a second drive gear 82 in constant meshed engagement with a second driven gear 84. First drive gear 76 is fixed for rotation with a transfer shaft 86 providing power from two-speed drive module 50. First driven gear 78 and second drive gear 82 are fixed for rotation with a countershaft 88 rotatably supported by bearings 90. First drive gear 76 is fixed via a spline connection 92 for rotation with transfer shaft 86 while second driven gear 84 is fixed to a casing 94 of bevel differential 72. Thrust bearings 96 and 98 are provided on either side of first drive gear 76. Other bearing arrangements are possible.

With reference to FIG. 5, bevel differential 72 includes a pair of bearings 100 rotatably supporting bell-shaped casing 94. Bevel differential 72 further includes a first side gear 108 fixed via a spline connection 110 to a first output shaft 112, a second side gear 114 fixed via a spline connection 116 to a second output shaft 118, and at least one pair of pinions 120 meshed with side gears 108 and 114. Pinions 120 are rotatably supported on a pinion shaft 122 having its opposite ends located in polar apertures 124 formed in casing 94. In addition, snap rings 126 and 128 axially restrain side gears 108 and 114 relative to the respective output shafts 112 and 118.

A parking pawl assembly 130 is provided to selectively ground a parking gear 132 integrally formed with first drive gear 76 to housing 42. Parking gear 132 includes a plurality of teeth 134 selectively engageable with a parking pawl 136 rotatably positioned on a pawl shaft 138. When parking pawl 136 is engaged with teeth 134, rotation of the components within reduction unit 70 is restricted. Accordingly, movement of vehicle 10 is also restricted. Parking pawl 136 may be rotatably displaced about pawl shaft 138 to become disengaged from teeth 134 to allow rotation of the components within reduction unit 70 as previously described.

In accordance with a use of electric drive module 32, output shafts 112 and 118 are adapted to be connected to corresponding ones of front axleshafts 36 and 40 for the hybrid powertrain arrangement shown in FIG. 1 or, alternatively, to corresponding ones of rear axleshafts 28 and 30 for the powertrain arrangement shown in FIG. 2. In this manner, electric drive module 32 functions as an electrically-powered secondary axle assembly which can be controlled independently, or in combination with, the engine-based powertrain. To provide a compact arrangement, second output shaft 118 is shown to extend through tubular rotor shaft 62.

Figure 7:
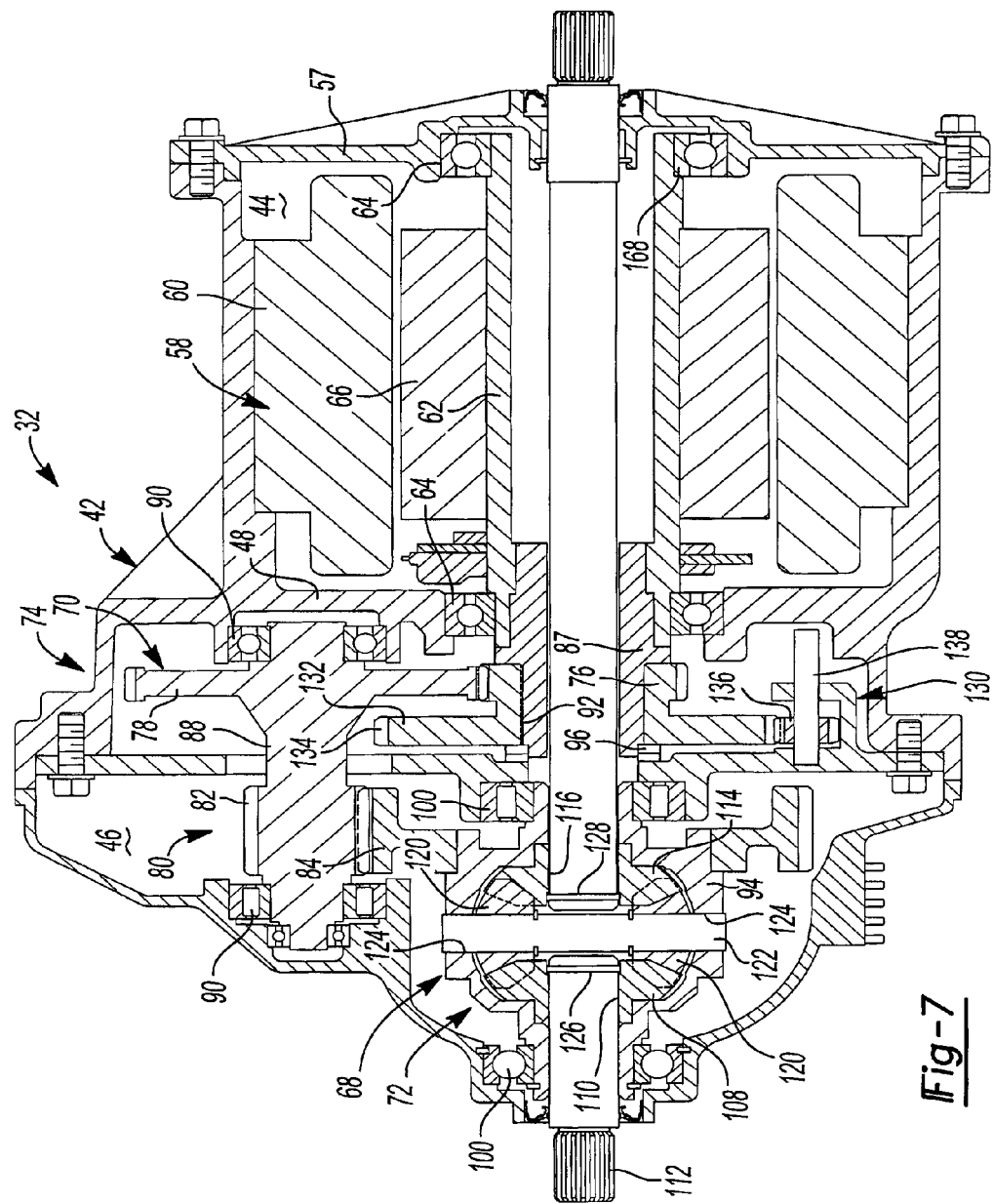
FIG. 7 is a cross-sectional side view of the electric drive module configured as a single speed unit without the two-speed module.

It should be appreciated that electric drive module 32 may be configured as a single speed power transmission device as shown in FIG. 7 by assembling nearly all of the previously described components without two-speed module 50. Cap 57 is coupled to housing 42 in place of two-speed module 50. A transfer shaft 87 need not extend through rotor shaft 62 as previously described in relation to transfer shaft 86. As such, rotor shaft 62 transfers torque directly to first drive gear 76.

Referring once again to the two-speed arrangement, as best depicted in FIGS. 4 and 6, two-speed module 50 includes a planetary gearset 140, a first clutch 142, a second clutch 144 and a clutch actuator 146 acting in cooperation with each other to selectively provide one of a first gear ratio (LOW) and a second gear ratio (HIGH) between rotor shaft 62 and transfer shaft 86. Planetary gearset 140 includes an annulus gear 148 fixed for rotation with a hub 150 via a spline connection 152. Hub 150 is fixed for rotation with rotor shaft 62 via another spline connection 154. Planetary gearset 140 also includes a sun gear 156 and a carrier 158. A plurality of pinion gears 160 are supported for rotation on pins 161 of carrier 158 and positioned in constant meshed engagement with annulus gear 148 and sun gear 156. Sun gear 156 is integrally formed at one end of a concentric shaft 162. Carrier 158 includes an axially extending cylindrical portion 164 interconnected with transfer shaft 86 via a spline 166. A bearing 168 rotatably supports hub 150 on cylindrical portion 164.

First clutch 142 includes a drum 180 fixed to annulus gear 148 via a spline 182. A hub 184 of first clutch 142 includes a radially inwardly positioned collar 186 fixed for rotation with concentric shaft 162 and sun gear 156 via a spline connection 188. Hub 184 also includes a radially outwardly positioned cylindrical portion 190 integrally formed with collar 186 and radially extending webs 192.

First clutch 142 also includes a plurality of outer clutch plates 194 fixed for rotation with and axially moveable relative to drum 180 via a spline connection 196. A plurality of inner clutch plates 198 are fixed for rotation with and axially moveable relative to cylindrical portion 190. Outer clutch plates 194 are interleaved with inner clutch plates 198. Outer clutch plates 194 and inner clutch plates 198 of first clutch 142 are bounded by a flange 199 integrally formed as a portion of hub 184 and a reaction plate 200 that is restricted from axial movement in one direction by a snap ring 201 coupled to drum 180.

A load plate 202 is supported on concentric shaft 162 and restricted from axial motion relative thereto by a flange 204 and a snap ring 206. A thrust bearing 208 is positioned between carrier 158 and load plate 202. A spring 210 urges hub 184 away from load plate 202 and relative to drum 180. Spring 210 biases hub 184 toward a first position where flange 199 applies a compressive force to outer clutch plates 194 and inner clutch plates 198 to transfer torque through first clutch 142.

Second clutch 144 includes a plurality of inner clutch plates 250 fixed for rotation with hub 184 at cylindrical portion 190. A plurality of outer clutch plates 252 are interleaved with inner clutch plates 250 and fixed to case 52. A reaction plate 254 is also fixed to case 52. An actuator plate 256 is positioned on the opposite side of reaction plate 254 to capture inner clutch plates 250 and outer clutch plates 252 therebetween. Actuator plate 256 may be integrally formed with or drivingly coupled to a first cam plate 260 of actuator 146.

Actuator 146 is depicted as a ball ramp actuator including an axially moveable first cam plate 260 cooperating with a rotatable second cam plate 262. First cam plate 260 is restricted from rotation and second cam plate 262 is restricted from translation. Cam plates 260 and 262 each include tapered circumferentially extending grooves 264 and 266, respectively. A ball 268 is positioned within cam grooves 264, 266. Because the cam grooves are tapered, relative rotation between second cam plate 262 and first cam plate 260 induces axial movement of first cam plate 260 relative to second cam plate 262. A thrust bearing 272 is positioned between second cam plate 262 and case 52 to react the axial load generated by actuator 146. Cam plate 262 also includes a plurality of gear teeth 274 formed on an outer circumferential surface.

An actuator gear 276 is in constant meshed engagement with gear teeth 274. An input spindle 278 is integrally formed with actuator gear 276. A source of torque such as an electric motor 280 is drivingly coupled to input spindle 278. Electric motor 280 may be controlled to rotate input spindle 278 in either direction. As such, second cam plate 262 may be rotated in either direction to move first cam plate 260 axially relative thereto. First cam plate 260 is moveable between a first position closest to second cam plate 262 and a second position furthest from second cam plate 262. Spring 210 urges hub 184 and first cam plate 260 toward the first position via a thrust bearing 290. When first cam plate 260 is in the first position, actuator plate 256 is located at a retracted position and a load is not applied to inner clutch plates 250 or outer clutch plates 252. At this time, torque is not transferred through second clutch 144.

It should be appreciated that while clutch actuator 146 is depicted as an electric motor driven ball ramp actuator, other actuators capable of providing an axial apply force to actuator plate 256 and hub 184 are also contemplated. Specifically, a hydraulically powered piston, an electrical solenoid, an electrically powered linear actuator or the like may be incorporated in lieu of the geared ball ramp arrangement.

In operation, the actuation of electric motor assembly 58 causes concurrent rotation of hub 150 and annulus gear 148. If the LOW gear ratio is desired, such as during vehicle launch, electric motor 280 is actuated to rotate input spindle 278 and actuator gear 276. Counter rotation of second cam plate 262 drives first cam plate 260 axially to provide an input force to actuator plate 256 and transfer torque through second clutch 144. At this time, hub 184 and sun gear 156 are restricted from rotation relative to case 52. The axial translation of first cam plate 260 also causes hub 184 to axially translate. Flange 199 is disengaged from outer clutch plates 194 and inner clutch plates 198 such that torque is not transferred through first clutch 142. With first clutch 142 being in the open, non torque-transferring condition, drum 180 and annulus gear 148 may rotate relative to hub 184 and sun gear 156. Based on the specific geometries of the meshing gears, a speed reduction ratio is provided by planetary gearset 140 with annulus gear 148 being the input and carrier 158 being the output of planetary gearset 140.

Power is transferred from carrier 158 through transfer shaft 86, first reduction gearset 74, second reduction gearset 80 and bevel differential 72. Power is then transferred through pinions 120 to side gears 108 and 114 and ultimately to output shafts 112 and 118. Variable speed control of motor assembly 58 permits the torque delivered to the wheels to be variably controlled.

When operation of electric drive module 32 in the HIGH gear ratio is desired, electric motor 280 is energized to rotate actuator gear 276 in the opposite direction from that previously described. Second cam plate 262 is rotated relative to first cam plate 260 such that ball 268 moves toward deeper portions of grooves 264, 266. Spring 210 biases hub 184 and first cam plate 260 toward the first position. Actuator plate 256 no longer applies a compressive force and second clutch 144 no longer transfers torque. Flange 199 applies a compressive force to the clutch plates of first clutch 142 and torque is transferred therethrough. At this time, annulus gear 148 is fixed for rotation with sun gear 156 to place planetary gearset 140 in a locked or direct-drive mode. Two-speed drive module 50 does not provide gear reduction when planetary gearset 140 operates in the direct drive mode. The overall speed reduction ratio provided by electric drive module 32 is defined by first gearset 74, second gearset 80 and bevel differential 72. The HIGH drive ratio may also be achieved when no power is provided to electric motor 280. Spring 210 provides the necessary energy to transfer torque through first clutch 142.

As shown in FIGS. 1-3, a controller 292 is in communication with a battery 294, vehicle sensors 296, electric drive module 32 as well as the engine and transmission, if present. Concurrent control of engine 16, transmission 18 and electric drive module 32 is described in issued U.S. Pat. Nos. 6,595,308 and 6,604,591, which are herein incorporated by reference.

Figure 8:
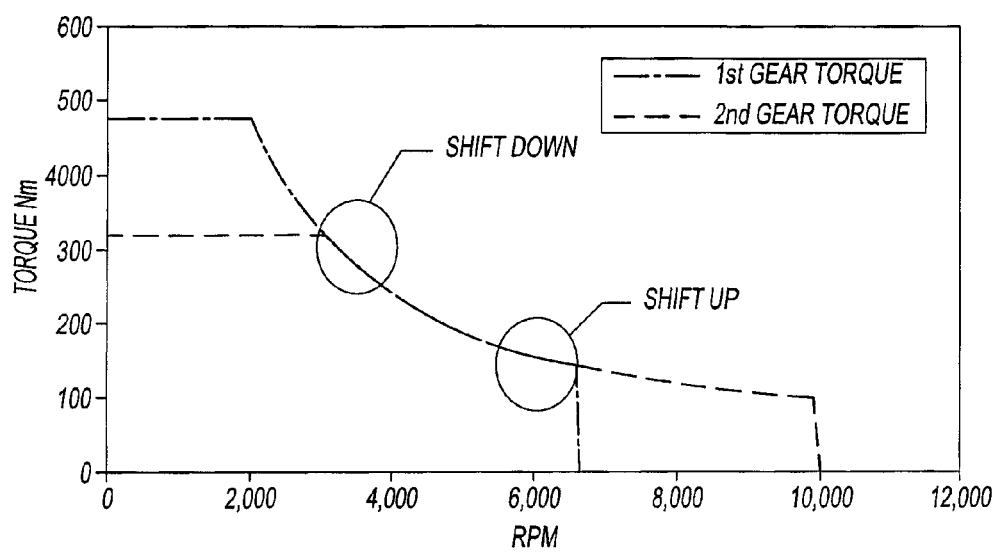
FIG. 8 is a graph depicting torque versus electric motor speed.

In relation to the two-speed arrangement, controller 292 is operable to control clutch actuator 146 and execute an upshift from LOW to HIGH or a downshift from HIGH to LOW, as desired. FIG. 8 depicts an exemplary torque output versus electric motor RPM graph depicting electric drive module 32 operating in the LOW gear ratio as well as the HIGH gear ratio. Based on the torque transmission characteristics of the electric motor, it may be desirable to operate the electric motor at higher speeds. FIG. 8 also depicts target upshift and downshift rotor speeds to optimize performance of electric drive module 32. Controller 292 may also place electric drive module 32 in a regeneration mode such that energy from vehicle 10 may be used to charge battery 294 during a vehicle descent or braking event.

Figure 9:
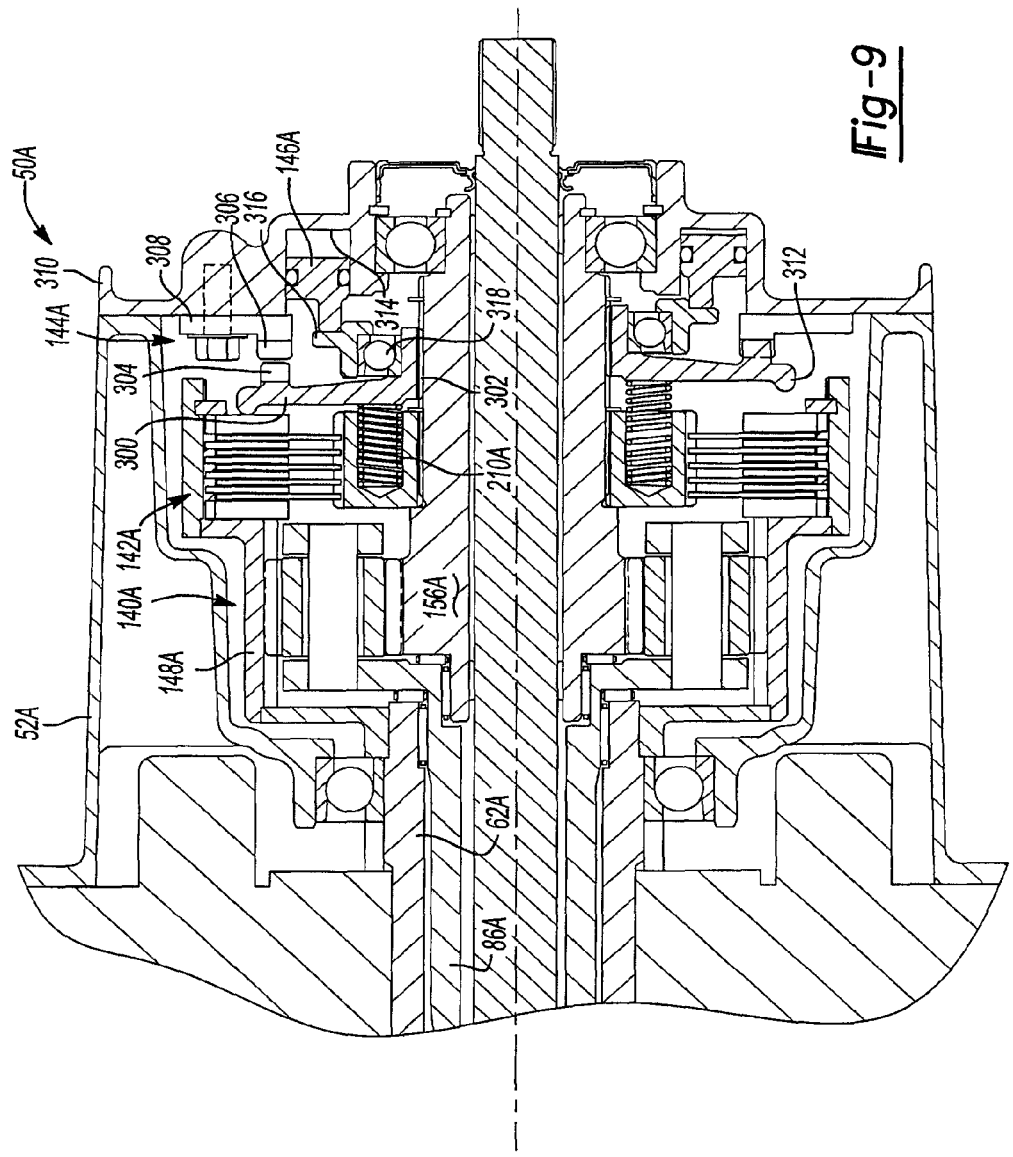
FIG. 9 is a fragmentary sectional view showing an alternative electric drive two speed module.

Referring to FIG. 9, a modified two-speed module 50A is shown wherein the interleaved plate arrangement of second clutch 144 is replaced with a dog clutch 144A. Additionally, the electric motor, gear and ball ramp arrangement of actuator 146 has been replaced with a slidable hydraulically controlled piston identified at reference numeral 146A.

Dog clutch 144A includes an axially moveable sleeve 300 fixed for rotation with sun gear 156A via a spline connection 302. Spring 210A biases sleeve 300 toward the position depicted in the bottom of FIG. 9 where teeth 304 formed on sleeve 300 engage teeth 306 formed on a reaction ring 308. Reaction ring 308 is fixed to an end cap 310 fastened to case 52A. At this time, dog clutch 144A is in the locked condition restricting rotation of sun gear 156A relative to case 52A. Furthermore, when sleeve 300 is in the retracted position described, a bulbous portion 312 of sleeve 300 is spaced apart from and does not apply a force to first clutch 142A. Torque is not transferred through clutch 142A and annulus gear 148A is free to rotate relative to sun gear 156A. A reduced gear ratio may now be provided between rotor shaft 62A and transfer shaft 86A. As such, the LOW gear ratio is maintained when no power is supplied to actuator 146A.

To shift two-speed module 50A from LOW to HIGH, pressurized fluid is provided to a cavity 314 containing piston 146A. Translation of piston 146A causes an apply ring 316 to also be axially translated in the same direction. Apply ring 316 is supported by a bearing 318 journaled on sleeve 300. Concurrent translation of sleeve 300 occurs to disengage dog teeth 304 from dog teeth 306 thereby allowing sun gear 156A to rotate relative to case 52A. At approximately the same time, bulbous portion 312 applies a compressive force to first clutch 142A to fix annulus gear 148A and sun gear 156A for rotation with one another. As previously described, these actions place planetary gearset 140A in a direct drive mode.

Figure 10:
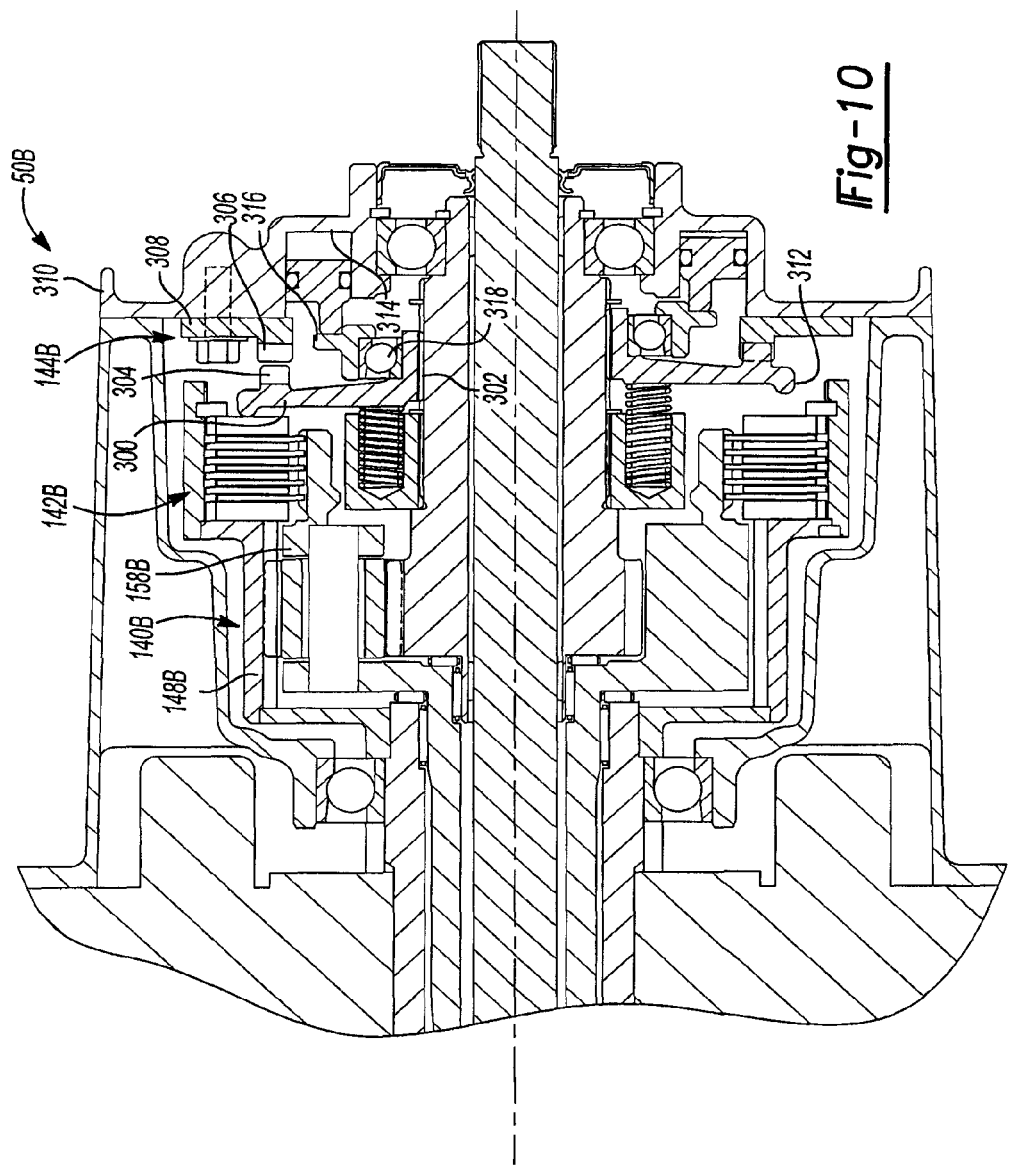
FIG. 10 is fragmentary sectional view showing another alternative electric two speed module.

FIG. 10 depicts another alternate two-speed module identified at reference numeral 50B. Module 50B is substantially similar to module 50A except that first clutch 142B operates to selectively fix annulus gear 148B with carrier 158B instead of the annulus gear-sun gear interconnection previously described. More particularly, when it is desired to operate two-speed module 50B in the HIGH gear range, dog clutch 144B is in the open mode while plate clutch 142B transfers torque fixing annulus gear 148B and carrier 158B for rotation with one another thereby placing planetary gearset 140B in the direct drive or 1:1 ratio mode.

Figure 11:
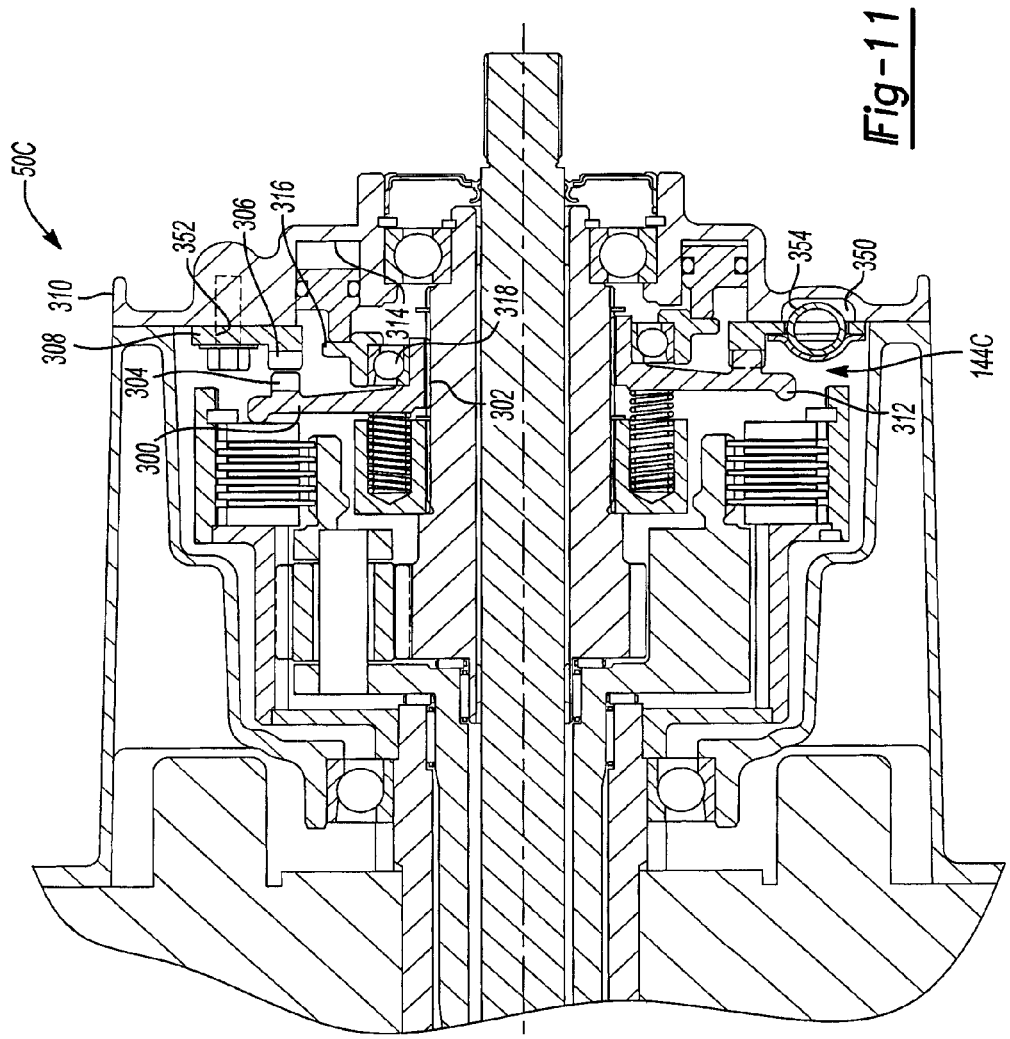
FIG. 11 is fragmentary sectional view showing another alternative electric two speed module.

FIG. 11 depicts another alternate two-speed module 50C including a damper 350 associated with dog clutch 144C. Damper 350 includes a reaction ring 308 having elongated openings 352 allowing rotational movement relative to end cap 310. A circumferentially positioned spring 354 positions reaction ring 308 at a nominal position but allows limited relative rotation against the force of the spring to provide a damper for dog clutch engagement.

Figure 12:
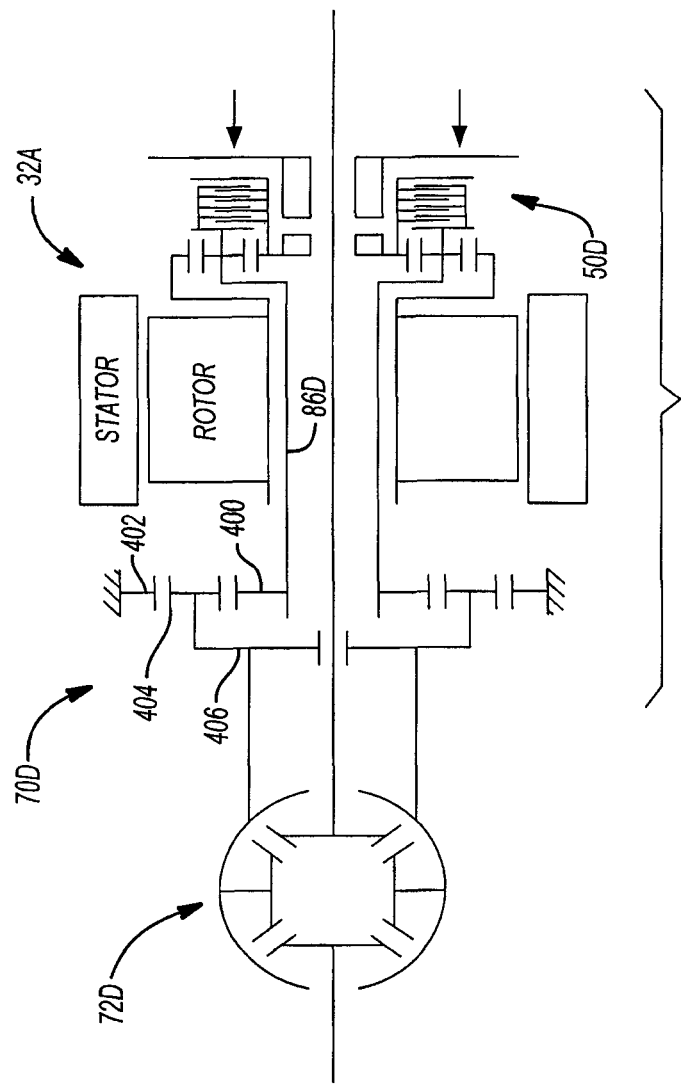
FIG. 12 is a schematic of another alternative electric drive module having coaxially aligned drive members.

FIG. 12 depicts another alternate electric drive module identified at reference numeral 32A. Electric drive module 32A includes a planetary gearset 70D replacing the offset countershaft gear arrangement 70. A sun gear 400 is fixed for rotation with transfer shaft 86D. An annulus gear 402 is restricted from rotation and is coupled to housing assembly 42D. A plurality of pinion gears 404 are rotatably supported on a carrier 406 and placed in constant meshed engagement with annulus gear 402 and sun gear 400. An additional differential assembly or final drive unit may be provided if desired.

Figure 13:
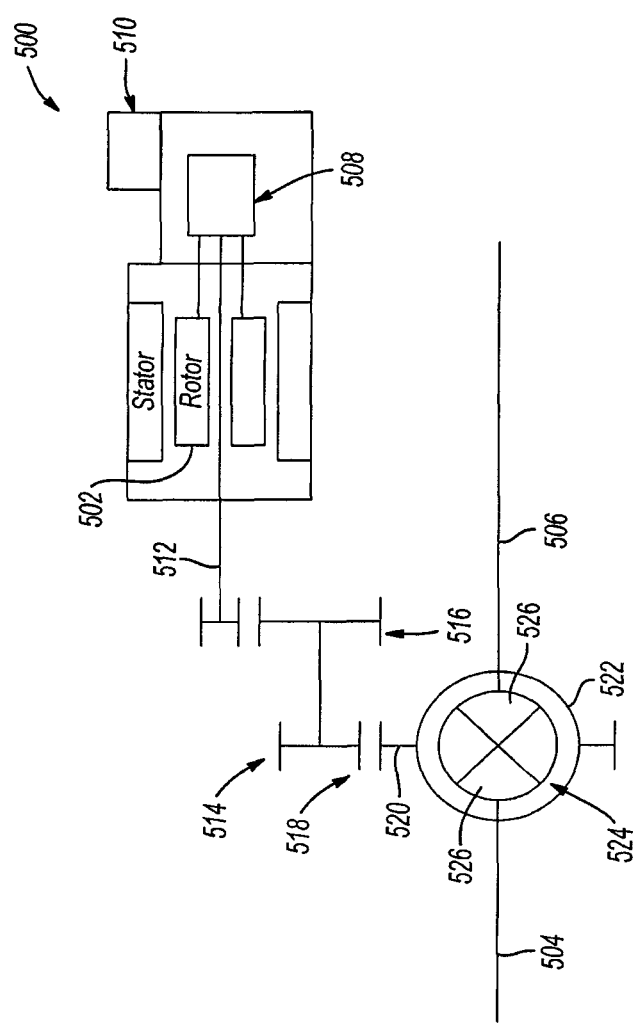
FIG. 13 is a schematic of an alternate electric drive module having offset output members.

FIG. 13 depicts another alternate electric drive module identified at reference numeral 500. Electric drive module 500 provides an offset or non-axial version of a transaxle where the axis of rotation of a rotor 502 is offset from and substantially parallel to a common axis of rotation of a first output shaft 504 and a second output shaft 506. More particularly, FIG. 13 depicts rotor 502 drivingly associated with a two-speed module 508. Two-speed module 508 may be configured as a gearset including an offset countershaft, a planetary gearset or another speed reduction arrangement. An actuator 510 is operable to control two-speed module 508 to selectively output one of two different gear ratios to an output shaft 512. Output shaft 512 provides power to a final drive unit 514 including a first gearset 516 and a second gearset 518. A driven gear 520 of gearset 518 is fixed for rotation with a housing 522 of a differential assembly 524. Side gears 526 of differential assembly 524 drive first output shaft 504 and second output shaft 506. It is contemplated that the offset arrangement may be useful in packaging electric drive module 500 within vehicles having certain suspension and underbody configurations that may preclude use of the coaxially aligned version previously described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module for motor vehicles having first and second wheels, comprising:
   an electric motor;
   an input member driven by said electric motor;
   an output member;
   a two-speed module operable for selectively establishing first and second speed ratio drive connections between said input member and said output member, said two-speed module including a gearset, a first clutch, a second clutch, and a clutch actuator, said gearset including a first component driven by said input member, a second component driving said output member, and a third component, said first clutch being operable in a released mode to permit relative rotation between said first component and said second and third components and in an engaged mode to restrict relative rotation between said first component and said second and third components, said second clutch being operable in a released mode to permit rotation of said third component and in an engaged mode to restrict rotation of said third component, said clutch actuator being operable in a first mode to establish said first speed ratio drive connection by shifting said first clutch into its engaged mode and said second clutch into its released mode, and said clutch actuator being operable in a second mode to establish said second speed ratio drive connection by shifting said first clutch into its released mode and said second clutch into its engaged mode; and a differential assembly having a differential input driven by said output member, a first differential output drivingly connected to the first wheel, and a second differential output drivingly connected to the second wheel.

2. The two-speed electric drive module of claim 1 further including a reduction unit having a reduction input driven by said output member and reduction output driving said differential input, wherein said reduction output is driven at a reduced speed relative to said reduction input.

3. The two-speed electric drive module of claim 1 wherein said first speed ratio drive connection is a direct drive ratio between said input member and said output member, and wherein said second speed ratio drive connection is an underdrive ratio between said input member and said output member.

4. The two-speed electric drive module of claim 3 wherein said clutch actuator includes an actuation member that is moveable between a first position and a second position, a biasing member for biasing said actuation member into its first position, and a power-operated device for moving said actuation member from its first position into its second position in opposition to the biasing of said biasing member.

5. The two-speed electric drive module of claim 4 wherein said actuation member is operable in its first position to shift said clutch actuator into its first mode and establish said direct drive speed ratio drive connection between said input member and said output member, and wherein said actuation member is operable in its second position to shift said clutch actuator into its second mode and establish said underdrive speed ratio drive connection between said input member and said output member.

6. The two-speed electric drive module of claim 4 wherein said actuation member is operable in its first position to shift said clutch actuator into its second mode and establish said underdrive speed ratio drive connection between said input member and said output member, and wherein said actuation member is operable in its second position to shift said clutch actuator into its first mode and establish said direct drive ratio drive connection between said input member and said output member.

7. The two-speed electric drive module of claim 1 further comprising a housing defining a motor chamber and a gearbox chamber, wherein said electric motor is disposed within said motor chamber, wherein said differential assembly is disposed within said gearbox chamber, wherein said two-speed module includes a casing mounted to an end of said housing opposite said gearbox chamber, wherein said electric motor includes a rotor shaft extending into said casing and defining said input member, wherein said gearset is disposed within said casing and includes an annulus gear as its first component, a carrier as its second component, a sun gear as its third component, and planet gears rotatably supported from said carrier and which are meshed with said annulus gear and said sun gear, and wherein said output member is a transfer shaft extending through said motor chamber and interconnecting said carrier to said differential input.

8. An electric drive module for a motor vehicle, having first and second wheels, comprising:
an electric motor;
an input member driven by said electric motor;
an output member;
a two-speed module driven by said input member for selectively driving said output member at first and second speed ratios, said two-speed module including a gearset, a first clutch and a second clutch, said gearset including a first component driven by said input member, a second component driving said output member, and a third component, said first clutch being operable to selectively couple one of said second component and said third component for rotation with said first component, said second clutch being operable to selectively restrict rotation of said third component, and wherein one of said first and second clutches is normally operable in a closed, torque transferring mode while the other one of said first and second clutches is normally operable in an open non-torque transferring mode to establish a corresponding one of said first and second drive ratios; and
a differential assembly having an input driven by said output member, a first differential output driving the first wheel, and a second differential output driving the second wheel.

9. The electric drive module of claim 8 further comprising a reduction unit having a reduction input member driven by said output member and a reduction output number driving said differential input at a reduced speed relative to said output member.

10. The electric drive module of claim 8 wherein the reduction unit and the differential assembly are positioned at a first end of said electric motor and said two-speed module is positioned at an opposite end of the electric motor.

11. The electric drive module of claim 10 wherein said second drive ratio is an underdrive ratio between said input member and said output member, and wherein said underdrive ratio is established when said first clutch is operating in its open non-torque transferring mode and said second clutch is operating in its close torque transferring mode.

12. The electric drive module of claim 11 wherein said two-speed module further includes a clutch actuator having an actuation member that is moveable between first position and second positions, wherein said actuation member is operable in its first position such that said first clutch is operating in its closed torque transferring mode and said second clutch is operating in its open non-torque transferring mode so as to establish said direct drive ratio, and wherein said actuation member is operable in its second position such that said first clutch is operating its open non-torque transferring mode and said second clutch is operating its closed torque transferring mode and said second clutch is operating in its open non-torque transferring mode so as to establish said underdrive ratio.

13. The electric drive module of claim 11 wherein said two-speed module further includes a clutch actuator having an actuation member that is moveable between first and second positions, wherein said actuation member is operable in its first position such that said first clutch is operating in its open non-torque transferring mode and said second clutch is operating in its closed torque transferring mode so as to establish said underdrive mode, and wherein said actuation member is operable in its second position such that said first clutch is operating in its closed torque transferring mode and said second clutch is operating in its open non-torque transferring mode so as to establish said direct drive ratio.

14. The electric drive module of claim 11 further comprising a housing defining a motor chamber and a gearbox chamber, wherein said electric motor is disposed within said motor chamber, wherein said differential assembly is disposed within said gearbox chamber, wherein said two-speed module includes a casing mounted to an end of said housing opposite said gearbox chamber, wherein said electric motor includes a rotor shaft extending into said casing and defining said input member, wherein said gearset, said first clutch and said second clutch are disposed within said casing, wherein said gearset is a planetary gearset having an annulus gear as its first component, a planet carrier as its second component which supports planet gears that are meshed with said annulus gear, and a sun gear as its third component that is meshed with said planet gears, and wherein said output member is a transfer shaft extending through said motor chamber and interconnecting said planet carrier to said differential input.

15. The electric drive module of claim 14 wherein said first clutch is operably disposed between said annulus gear and one of said planet carrier and said sun gear, and wherein said second clutch is operably disposed between said casing and said sun gear.

16. The electric drive module of claim 15 wherein said first clutch is a first multi-plate friction clutch operably disposed between said annulus gear and said sun gear, and wherein said second clutch is a second multi-plate friction clutch operably disposed between said casing and said sun gear.

17. The electric drive module of claim 15 wherein said first clutch is a multi-plate friction clutch operably disposed between said annulus gear and said sun gear, and wherein said second clutch is a dog clutch disposed between said sun gear and said casing.

18. The electric drive module of claim 14 further including a reduction unit having a first drive gear driven by said transfer shaft, a first driven gear meshed with said first drive gear, a second drive gear driven by said first driven gear, and a second driven gear meshed with said second drive gear and driving said differential input.

19. The electric drive module of claim 14 further including a reduction unit configured as a second planetary gearset having a second sun gear driven by said transfer shaft, a second annulus gear fixed to said housing in said gearbox chamber, a second planet carrier driving said differential input, and second planet gears rotatably supported by said second planet carrier and meshed with said second sun gear and said second annulus gear.

20. An electric drive module for a motor vehicle, comprising:
an electric motor having a motor shaft;
a transfer shaft;
a two-speed arrangement operable for selectively establishing first and second speed ratio drive connections between said motor shaft and said transfer shaft, said two-speed arrangement including a planetary gearset, a first clutch, a second clutch, and a clutch actuator, said planetary gearset including an annulus gear driven by said motor shaft, a carrier driving said transfer shaft, a sun gear, and planet gears rotatably supported by said carrier and which are meshed with said annulus gear and said sun gear, said first clutch being operably disposed between said annulus gear and one of said carrier and said sun gear, said second clutch being operably disposed between said sun gear and a stationary member, wherein said first speed ratio drive connection is established when said first clutch is engaged and said second clutch is released, wherein said second speed ratio drive connection is established when said first clutch is released and said second clutch is engaged, and wherein said clutch actuator is operable in a first mode for engaging said first clutch and releasing said second clutch to establish said first speed ratio drive connection and in a second mode for releasing said first clutch and engaging said second clutch to establish said second speed ratio drive connection; and
a differential assembly having a differential input driven by said transfer shaft and first and second differential outputs driven by said differential input.

21. The electric drive module of claim 20 wherein said first speed ratio drive connection is a direct drive connection established when said first clutch is engaged for coupling one of said carrier and said sun gear to said annulus gear and said second clutch is released to permit rotation of said sun gear relative to said stationary member, and wherein said second speed ratio drive connection is an underdrive connection established when said first clutch is released to permit relative rotation between said carrier and said annulus gear and said second clutch is engaged to restrict rotation of said sun gear.

22. The electric drive module of claim 20 wherein said differential assembly is located on one side of said electric motor and said two-speed arrangement is located on the other side of said electric motor, wherein said motor shaft concentrically surrounds said transfer shaft, wherein said transfer shaft concentrically surrounds an output shaft fixed to one of said first and second differential outputs, and wherein a reduction unit is disposed between said transfer shaft and said differential assembly to provide a speed reduction between said transfer shaft and said differential input.

23. The electric drive module of claim 20 wherein said first clutch is a first multi-plate clutch disposed between a first clutch component fixed to said annulus gear and a second clutch compound fixed to one of said carrier and said sun gear, wherein said second clutch is a second multi-plate clutch disposed between said second clutch component and said stationary member.

24. The electric drive module of claim 20 wherein said first clutch includes a biasing arrangement operable to normally operate said clutch actuator in its first mode.

25. The electric drive module of claim 20 wherein said second clutch includes a biasing arrangement operable to normally operate said clutch actuator in its second mode.

26. The electric drive module of claim 20 wherein said first clutch is a multi-plate friction clutch disposed between said annulus gear and one of said carrier and said sun gear, wherein said second clutch is a dog clutch having a sleeve splined for rotation with and axial movement on said sun gear, wherein a biasing member normally biasing said sleeve into a first position whereat said sleeve couples said sun gear to said stationary member and is displaced from engagement with said multi-plate friction clutch for establishing said second speed ratio drive connection, said sleeve being moveable to a second position whereat said sleeve uncouples said sun gear from said stationary member and engages said multi-plate friction clutch for establishing said first speed ratio, and wherein said clutch actuator is operable for moving said sleeve between its first and second positions.

* * * * *